(12) United States Patent
Kim et al.

(10) Patent No.: US 12,109,988 B2
(45) Date of Patent: Oct. 8, 2024

(54) BRAKE APPARATUS FOR VEHICLE

(71) Applicant: HYUNDAI MOBIS Co., Ltd., Seoul (KR)

(72) Inventors: Hyeong Sik Kim, Yongin-si (KR); Choong Sik Shin, Yongin-si (KR); Taik Sang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 388 days.

(21) Appl. No.: 17/567,986

(22) Filed: Jan. 4, 2022

(65) Prior Publication Data

US 2022/0212648 A1 Jul. 7, 2022

(30) Foreign Application Priority Data

Jan. 4, 2021 (KR) .................. 10-2021-0000386
Jan. 11, 2021 (KR) .................. 10-2021-0003321

(51) Int. Cl.
| | |
|---|---|
| *B60T 13/74* | (2006.01) |
| *B60T 1/06* | (2006.01) |
| *F16D 65/18* | (2006.01) |
| *F16D 121/24* | (2012.01) |
| *F16D 125/40* | (2012.01) |
| *F16D 125/50* | (2012.01) |

(52) U.S. Cl.
CPC ............ *B60T 13/746* (2013.01); *B60T 1/065* (2013.01); *F16D 65/18* (2013.01); *F16D 2121/24* (2013.01); *F16D 2125/40* (2013.01); *F16D 2125/50* (2013.01)

(58) Field of Classification Search
CPC ...... B60T 1/065; B60T 13/741; B60T 13/746; F16D 65/18; F16D 2125/40; F16D 2125/50; F16D 2121/24
See application file for complete search history.

(56) References Cited

U.S. PATENT DOCUMENTS

| | | | | |
|---|---|---|---|---|
| 4,726,256 | A * | 2/1988 | von Kaler | F16H 3/72 475/900 |
| 2005/0109567 | A1* | 5/2005 | Baumann | F16D 65/18 188/72.8 |
| 2014/0158480 | A1* | 6/2014 | Qian | B60T 11/102 188/72.8 |
| 2015/0233434 | A1* | 8/2015 | Hayashi | F16D 65/18 188/72.6 |
| 2018/0355933 | A1* | 12/2018 | Sala | B60T 13/741 |

FOREIGN PATENT DOCUMENTS

KR 10-1094333 B1 12/2011

* cited by examiner

*Primary Examiner* — Nicholas J Lane
(74) *Attorney, Agent, or Firm* — Morgan, Lewis & Bockius LLP

(57) ABSTRACT

A brake apparatus for a vehicle may include: a housing; a drive part configured to generate power; a power transmission part disposed in the housing and configured to transmit the power from the drive part while rotating in conjunction with an operation of the drive part; and an anti-collision part disposed between the housing and the power transmission part and configured to prevent a collision between the housing and the power transmission part.

13 Claims, 15 Drawing Sheets

BRAKE APPARATUS FOR VEHICLE

CROSS-REFERENCE TO RELATED APPLICATION

This application claims priority from and the benefit of Korean Patent Application No. 10-2021-0000386 filed on Jan. 4, 2021 and Korean Patent Application No. 10-2021-0003321 filed on Jan. 11, 2021, which are hereby incorporated by reference for all purposes as if set forth herein.

TECHNICAL FIELD

Exemplary embodiments of the present disclosure relate to a brake apparatus for a vehicle, and more particularly, to a brake apparatus for a vehicle, which generates a braking force by operating a motor.

BACKGROUND

In general, a brake apparatus for a vehicle presses a piston by converting a rotational force of a drive motor into a rectilinear motion by using a screw-nut mechanism and produces a braking force by pressing a brake pad, which is a friction member, against a disc by moving a caliper by using a pressing force of the piston and a reaction force of the piston. After the braking, the brake apparatus eliminates the frictional force by separating the caliper and the piston from the brake pad by using knock-back between the brake pad and the disc and using a restoring force (roll-back) of a piston seal.

In general, an actuator provided in such a brake apparatus for a vehicle includes a motor and a power transmission device that operate friction pads installed on a caliper of the disc brake apparatus at the time of parking a vehicle. A rotational force of the motor of the actuator is transmitted to an input shaft of the caliper through the power transmission device such as a gear. As the input shaft rotates, a piston and a caliper housing move toward each other, and the two friction pads mounted on the piston and the caliper housing press two opposite surfaces of a disc, thereby restricting a rotation of the disc.

The actuator of the brake for a vehicle generates various types of noise such as noise amplified by rotations of gears, and the noise results in consumer dissatisfaction. To solve the problem, the actuator of the brake for a vehicle in the related art uses a helical gear that less generates noise. However, the helical gear causes axial forces between the gears, and the axial forces cause the gears to collide with another component, which generates another noise.

In addition, a structural limitation of the caliper of the parking brake apparatus in the related art cause the deformation of the caliper as the parking brake apparatus repeatedly operates. For this reason, an axis of a screw is distorted, and an excessive load is applied between the screw mechanism and the nut mechanism, which degrades power transmission efficiency. Further, a gap between the screw and a body is expanded, which causes a leak of oil in the caliper.

The background technology of the present disclosure is disclosed in Korean Patent No. 10-1094333 (registered on Dec. 8, 2011 and entitled 'Caliper-Integrated Electronic Parking Brake Actuator for Vehicle').

SUMMARY

An object of the present disclosure is to provide a brake apparatus for a vehicle, which is capable of offsetting axial forces applied to gears.

Another object of the present disclosure is to provide a brake apparatus for a vehicle, which is capable of preventing a direct collision between a gear and a housing.

Still another object of the present disclosure is to provide a parking brake apparatus for a vehicle, which is capable of preventing deterioration in power transmission efficiency and an oil leakage due to deformation of a caliper.

Various embodiments are directed to a brake apparatus for a vehicle, the brake apparatus including: a housing; a drive part configured to generate power by being a drive part configured to generate power; a power transmission part disposed in the housing and configured to transmit the power from the drive part while rotating in conjunction with an operation of the drive part; and an anti-collision part disposed between the housing and the power transmission part and configured to prevent a collision between the housing and the power transmission part.

The power transmission part may include: a first power transmission part configured to rotate by receiving the power from the drive part; a second power transmission part configured to engage with the first power transmission part and rotate in conjunction with a rotation of the first power transmission part; and a third power transmission part configured to engage with the second power transmission part and rotate in the same direction as the first power transmission part in conjunction with a rotation of the second power transmission part.

The first power transmission part and the third power transmission part may apply axial forces to the second power transmission part in a direction in which the axial forces are offset.

A tooth of the first power transmission part and a tooth of the third power transmission part may be inclined at a torsional angle in a second direction, and a tooth of the second power transmission part may be inclined at a torsional angle in a direction opposite to the second direction.

The second power transmission part may include: a second rotary shaft fixed to the housing; a first gear configured to rotate about the second rotary shaft and engage with the first power transmission part; a second gear configured to extend from the first gear, have a smaller diameter than the first gear, and engage with the third power transmission part; and a first friction reducer disposed between the first gear and the second rotary shaft and configured to support the first gear so that the first gear is rotatable.

The first friction reducer may include: an insertion portion in sliding contact with an inner peripheral surface of the first gear and configured such that the second rotary shaft is inserted into the insertion portion; a support portion extending in a radial direction of the insertion portion and configured to adjoin the housing and support the insertion portion; and a cut-out portion configured to penetrate the insertion portion and induce deformation of the insertion portion when the second rotary shaft is inserted into the insertion portion.

The anti-collision part may include: an anti-collision member configured to surround the insertion portion; and a movement prevention portion protruding from the anti-collision member, inserted into the insertion portion, and configured to prevent the anti-collision member from moving relative to the insertion portion.

The anti-collision member may provide an elastic restoring force, and as the second power transmission part moves toward the housing, the anti-collision member may be elastically deformed to prevent contact between the second power transmission part and the housing.

The drive part may be configured to receive external electric power.

Various embodiments are directed to a brake apparatus for a vehicle, the brake apparatus including: a caliper module having a cylinder part that faces a pad plate module; a piston module installed on the cylinder part so as to be movable forward or rearward and configured to deform the cylinder part by using a reaction force generated when the pad plate module is pressed; and a transmission module installed on the cylinder part and configured to move the piston module forward or rearward, in which an installation angle of the transmission module with respect to the piston module is changed when the cylinder part is deformed, such that a movement of the transmission module relative to the cylinder part is prevented.

In addition, the cylinder part may be rotated in a first direction by the reaction force generated by the piston module, and the power transmission module may rotate in the first direction together with the cylinder part.

In addition, the transmission module may include: a spindle part penetrating the cylinder part and configured to be rotated by a rotational force transmitted from an actuator; and a nut part configured to be in rollable contact with the piston module and press or release the piston module in conjunction with a rotation of the spindle part.

In addition, the nut part may include: a head portion having a front surface in rollable contact with a rear surface of the piston module in the first direction; a connection portion extending from a rear surface of the head portion and having an inner peripheral surface thread-coupled to an outer peripheral surface of the spindle part; and an anti-rotation portion disposed at a lateral side of the head portion and configured to prevent an axial rotation of the head portion by interfering with an inner surface of the piston module.

In addition, a curvature of the front surface of the head portion may correspond to a curvature of the rear surface of the piston module.

In addition, upper and lower surfaces of the head portion may be spaced apart from the inner surface of the piston module at predetermined intervals.

In addition, the brake apparatus may further include a sealing member provided between the cylinder part and the spindle part and configured to prevent a leak of oil, and a center of curvature of the head portion may be positioned rearward from the sealing member.

According to the brake apparatus for a vehicle according to the present disclosure, the anti-collision part may prevent the second power transmission part from colliding with the housing. Therefore, it is possible to reduce the occurrence of noise due to the instantaneous axial force.

In addition, according to the brake apparatus for a vehicle according to the present disclosure, the first power transmission part and the third power transmission part may apply the axial forces to the second power transmission part in the direction in which the axial forces are offset. Therefore, it is possible to prevent an excessive movement of the second power transmission part.

In addition, according to the brake apparatus for a vehicle according to the present disclosure, the first power transmission part, the second power transmission part, and the third power transmission part may each are provided in the form of a helical gear. Therefore, it is possible to transmit higher power and reduce noise due to the engagement.

In addition, according to the brake apparatus for a vehicle according to the present disclosure, the first friction reducer may reduce the frictional force generated by the rotation of the second power transmission part. Therefore, it is possible to prevent a loss of power transmission efficiency.

In addition, according to the brake apparatus for a vehicle according to the present disclosure, the anti-collision member may have the elastic restoring force and absorb impact due to the rapid movement of the second power transmission part. Therefore, it is possible to prevent damage to the second power transmission part.

In addition, according to the brake apparatus for a vehicle according to the present disclosure, the anti-collision member is disposed to surround the insertion portion and in close contact with the outer peripheral surface of the insertion portion. Therefore, it is possible to prevent the insertion portion from arbitrarily spreading out and separating from the second rotary shaft.

In addition, according to the brake apparatus a vehicle according to the present disclosure, the movement prevention portion may restrict the movement of the anti-collision part relative to the insertion portion. Therefore, it is possible to stably fix the position of the anti-collision member.

In addition, according to the brake apparatus for a vehicle according to the present disclosure, the installation angle of the power transmission part with respect to the piston module may be changed when the cylinder part is deformed by the reaction force of the piston module, such that the power transmission part may rotate together with the cylinder part in the first direction, which makes it possible to prevent deterioration in performance of the brake.

In addition, according to the brake apparatus for a vehicle according to the present disclosure, the front surface of the head portion may be in rollable contact with the inner rear surface of the piston module in the first direction, which makes it possible to prevent deterioration in power transmission efficiency due to the fitting between the nut part and the spindle part.

In addition, according to the brake apparatus for a vehicle according to the present disclosure, the curvature of the front surface of the head portion may correspond in value to the curvature of the rear surface of the piston module, which makes it possible to allow the head portion to smoothly roll without interfering with the rear surface of the piston module.

In addition, according to the brake apparatus for a vehicle according to the present disclosure, the center of curvature of the head portion may be positioned rearward from the sealing member, which makes it possible to prevent a leak of oil caused by the expansion of a gap between the cylinder part and the coupling portion.

DETAILED DESCRIPTION OF THE ILLUSTRATED EMBODIMENTS

Figure 1:
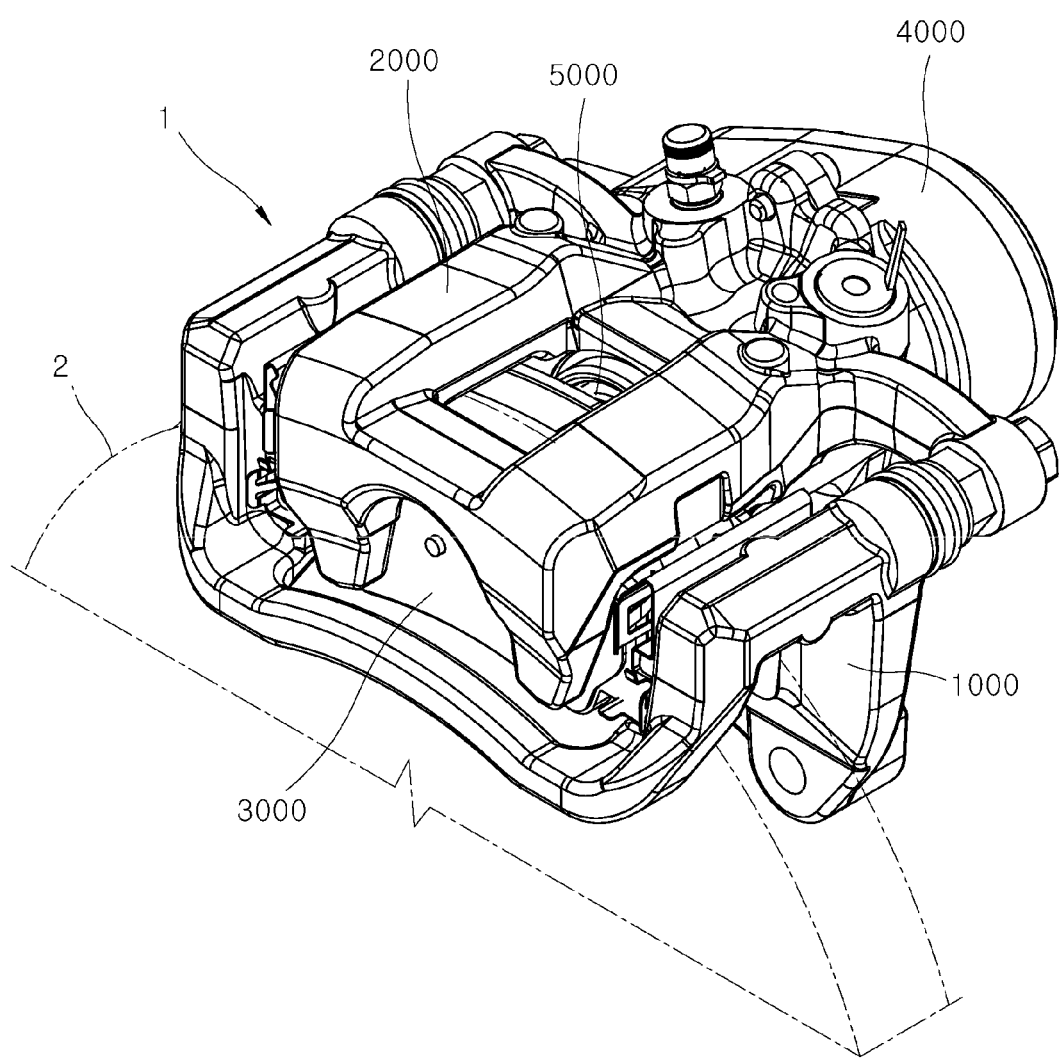
FIG. 1 is a perspective view schematically illustrating a configuration of a parking brake apparatus for a vehicle according to an embodiment of the present disclosure.

Hereinafter, an embodiment of a brake apparatus for a vehicle according to the present disclosure will be described with reference to the accompanying drawings.

Here, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

In addition, in the present specification, when one constituent element is referred to as being "connected to (or coupled to)" another constituent element, the constituent elements can be "directly connected to (coupled to)" each other, and can also be "indirectly connected to (coupled to)" each other with other elements interposed therebetween. Unless explicitly described to the contrary, the word "comprise (or include)" and variations such as "comprises (or includes)" or "comprising (or including)" will be understood to imply the further inclusion of stated elements, not the exclusion of the stated elements.

In addition, throughout the specification, the same reference numerals denote the same constituent elements. Even though the same or similar reference numerals are not mentioned or described with reference to specific drawings, the same or similar reference numerals may be described with reference to the other drawings. In addition, even though there are parts denoted by no reference numeral in specific drawings, the parts may be described with reference to the other drawings. In addition, the numbers, shapes, sizes, relative differences in sizes, and the like of the detailed constituent elements illustrated in the drawings of the present application are set for convenience of understanding, do not limit the embodiments, and may be variously implemented.

Figure 2:
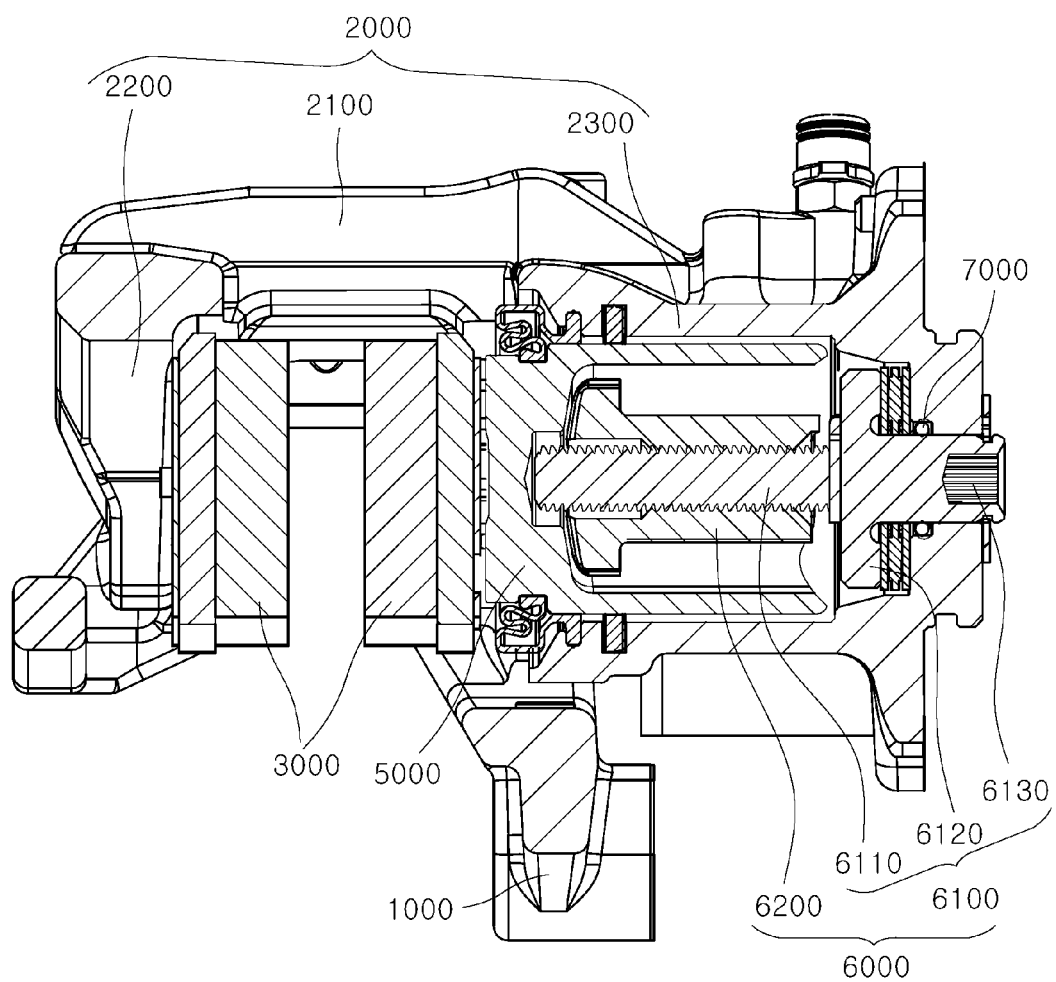
FIG. 2 is a cross-sectional view schematically illustrating the configuration of the parking brake apparatus for a vehicle according to the embodiment of the present disclosure.

FIG. 1 is a perspective view schematically illustrating a configuration of a parking brake apparatus for a vehicle according to an embodiment of the present disclosure, and FIG. 2 is a cross-sectional view schematically illustrating the configuration of the parking brake apparatus for a vehicle according to the embodiment of the present disclosure.

Referring to FIGS. 1 and 2, a parking brake apparatus 1 for a vehicle according to an embodiment of the present disclosure includes a carrier unit 1000, a caliper module 2000, pad plate modules 3000, an actuator 4000, a piston module 5000, a transmission module 6000, and a sealing member 7000.

The carrier unit 1000 is fixed to a vehicle body and supports the caliper module 2000 to be described below. The carrier unit 1000 according to the embodiment of the present disclosure may be fixed to a knuckle of the vehicle body by means of a mounting bolt or the like. The carrier unit 1000 may be made of a material having high rigidity, such as steel, to sufficiently endure a load transmitted from the caliper module 2000. The shape of the carrier unit 1000 is not limited to the shapes illustrated in FIGS. 1 and 2 and may be variously changed in design within the technical spirit of the shape capable of being fixed to the vehicle body.

The caliper module 2000 defines a schematic external appearance of the parking brake apparatus 1 for a vehicle according to the embodiment of the present disclosure and supports the piston module 5000 and the transmission module 6000 to be described below. The caliper module 2000 according to the embodiment of the present disclosure includes a bridge part 2100, a finger part 2200, and a cylinder part 2300.

The bridge part 2100 defines an upper external appearance of the caliper module 2000. The bridge part 2100 supports the finger part 2200 and the cylinder part 2300 to be described below. The bridge part 2100 is slidably connected to the carrier unit 1000 by means of a guide rod or the like. The bridge part 2100 is slid by a reaction force generated between the pad plate modules 3000 and the piston module 5000. The specific shape of the bridge part 2100 is not limited to the shapes illustrated in FIGS. 1 and 2 and the shape of the bridge part 2100 may be variously changed in design.

The finger part 2200 extends from one side of the bridge part 2100 and faces any one of the pair of pad plate modules 3000. The finger part 2200 may be integrated with the bridge part 2100 by welding, pressing, bending, or the like. Alternatively, the finger part 2200 may be detachably coupled to the bridge part 2100 by bolting or the like. The finger part 2200 presses or releases the pad plate module 3000 in conjunction with the sliding of the bridge part 2100. The finger part 2200 according to the embodiment of the present disclosure perpendicularly extends downward from a front end of the bridge part 2100. The finger part 2200 has an inner surface disposed to face one of the pair of pad plate modules 3000 disposed at an outer side (left side based on FIG. 2) based on the disc.

The cylinder part 2300 extends from the other side of the bridge part 2100 and faces the other of the pair of pad plate modules 3000. The cylinder part 2300 has therein a vacant space in which the piston module 5000 and the transmission module 6000 may be installed. The cylinder part 2300 may have an oil port through which brake oil is introduced so that a hydraulic pressure may be applied to the inside of the cylinder part 2300. The cylinder part 2300 according to the embodiment of the present disclosure extends downward from a rear end of the bridge part 2100. The cylinder part 2300 has a hollow cylindrical shape opened at one side thereof, and the opened side faces the other of the pair of pad plate modules 3000 disposed at an inner side (based on FIG. 2) based on the disc 2.

The pad plate modules 3000 are installed to be movable rearward or forward toward the disc 2 that rotates together with a vehicle wheel, and thus apply a braking force to the vehicle. According to the embodiment of the present disclosure, the pair of pad plate modules 3000 is provided. The pad plate modules 3000 respectively face outer and inner surfaces of the disc 2 with the disc 2 interposed therebetween. The pair of pad plate modules 3000 may be connected to the caliper module 2000 or the carrier unit 1000 so as to be movable forward or rearward. A friction pad made of a material, such as rubber, with a high frictional coefficient may be attached to one surface of the pad plate module 3000 facing the disc 2.

The actuator 4000 is installed at a rear side of the caliper module 2000 and generates driving power. The actuator 4000 is connected to the transmission module 6000 to be described below and transmits driving power to the transmission module 6000. A specific configuration of the actuator 4000 according to the embodiment of the present disclosure will be described below.

The piston module 5000 is installed on the cylinder part 2300 so as to be movable forward or rearward and presses or releases the pad plate module 3000 while being moved forward or rearward by the transmission module 6000 to be described below. The piston module 5000 deforms the cylinder part 2300 by using a reaction force generated when the pad plate module 3000 is pressed. More specifically, the piston module 5000 rotates the cylinder part 2300 in a first direction A by using the reaction force generated when the pad plate module 3000 is pressed. In this case, for example, the first direction D may be a counterclockwise direction based on FIG. 2 in a direction in which the cylinder part 2300 is moved outward from the pad plate module 3000.

The piston module 5000 according to the embodiment of the present disclosure has a cup shape opened at one side thereof. The closed side of the piston module 5000 faces the pad plate module 3000. An outer surface of the piston module 5000 is spaced apart from an inner surface of the cylinder part 2300 at a predetermined distance, thereby forming a clearance. In this case, the piston module 5000 is elastically supported in the cylinder part 2300 by a corrugated tube installed at a front side of the cylinder part 2300 or an O-ring installed in the cylinder part 2300. Therefore, the piston module 5000 may prevent deterioration in movement performance due to friction with the inner surface of the cylinder part 2300. Inner left and right surfaces of the piston module 5000 extend perpendicularly to an axial direction of the cylinder part 2300 and are disposed in parallel with each other, thereby preventing an axial rotation of a nut part 6200. An inner rear surface of the piston module 5000 may be curved at a predetermined curvature to guide a rolling motion of the transmission module 6000 to be described below. In this case, a center of curvature of the inner rear surface of the piston module 5000 may be positioned rearward from the sealing member 7000 to be described below. Alternatively, the inner rear surface of the piston module 5000 may have a straight shape.

The transmission module 6000 is installed in the cylinder part 2300 and moves the piston module 5000 forward or rearward by receiving driving power from the actuator 4000.

When the cylinder part 2300 is deformed, an installation angle of the transmission module 6000 with respect to the piston module is changed, such that the movement of the transmission module 6000 relative to the cylinder part is prevented. More specifically, when the cylinder part 2300 is rotated in the first direction D by a reaction force generated by the piston module 5000, the transmission module 6000 integrally rotates in the first direction D together with the cylinder part 2300. Therefore, the transmission module 6000 may prevent a gap of a connected portion with the cylinder part 2300 from being expanded when the cylinder part 2300 is deformed or prevent deterioration in power transmission performance due to a load.

The transmission module 6000 according to the embodiment of the present disclosure includes a spindle part 6100 and a nut part 6200.

The spindle part 6100 penetrates the cylinder part 2300 and is rotated by the rotational force transmitted from the actuator 4000. The spindle part 6100 according to the embodiment of the present disclosure includes a bolt portion 6110, a flange portion 6120, and a coupling portion 6130.

The bolt portion 6110 is disposed in the piston module 5000 and extends in a direction parallel to the axial direction of the piston module 5000. The bolt portion 6110 has a screw thread formed on an outer peripheral surface thereof and is thread-coupled to the nut part 6200 to be described below. The bolt portion 6110 has a front end thereof spaced apart from the inner rear surface of the piston module 5000 at a predetermined interval and facing the inner rear surface of the piston module 5000.

The flange portion 6120 extends from the outer peripheral surface of the bolt portion 6110 in a radial direction of the bolt portion 6110. Therefore, the flange portion 6120 may have an approximately circular plate shape. The flange portion 6120 is in contact with a thrust bearing installed on a rear surface of the cylinder part 2300 and supports an axial load, i.e., a reaction force transmitted through the bolt portion 6110 during the braking operation.

The coupling portion 6130 extends from a rear end of the bolt portion 6110 and penetrates a rear surface of the cylinder part 2300. The coupling portion 6130 is disposed in parallel with an extension direction of the bolt portion 6110. The coupling portion 6130 has a spline screw thread formed on an inner peripheral surface thereof and is connected to an output shaft of the actuator 4000. The coupling portion 6130 is integrally connected to the bolt portion 6110 and axially rotates together with the bolt portion 6110 when the actuator 4000 operates.

The nut part 6200 is connected to the spindle part 6100 and moves forward or rearward in a longitudinal direction of the spindle part 6100 in conjunction with the rotation of the spindle part 6100. The nut part 6200 presses or releases the piston module 5000 while coming into contact with the piston module 5000 or separating from the piston module 5000 in the rotation direction of the spindle part 6100. The nut part 6200 is in rollable contact with the piston module 5000.

Figure 3:
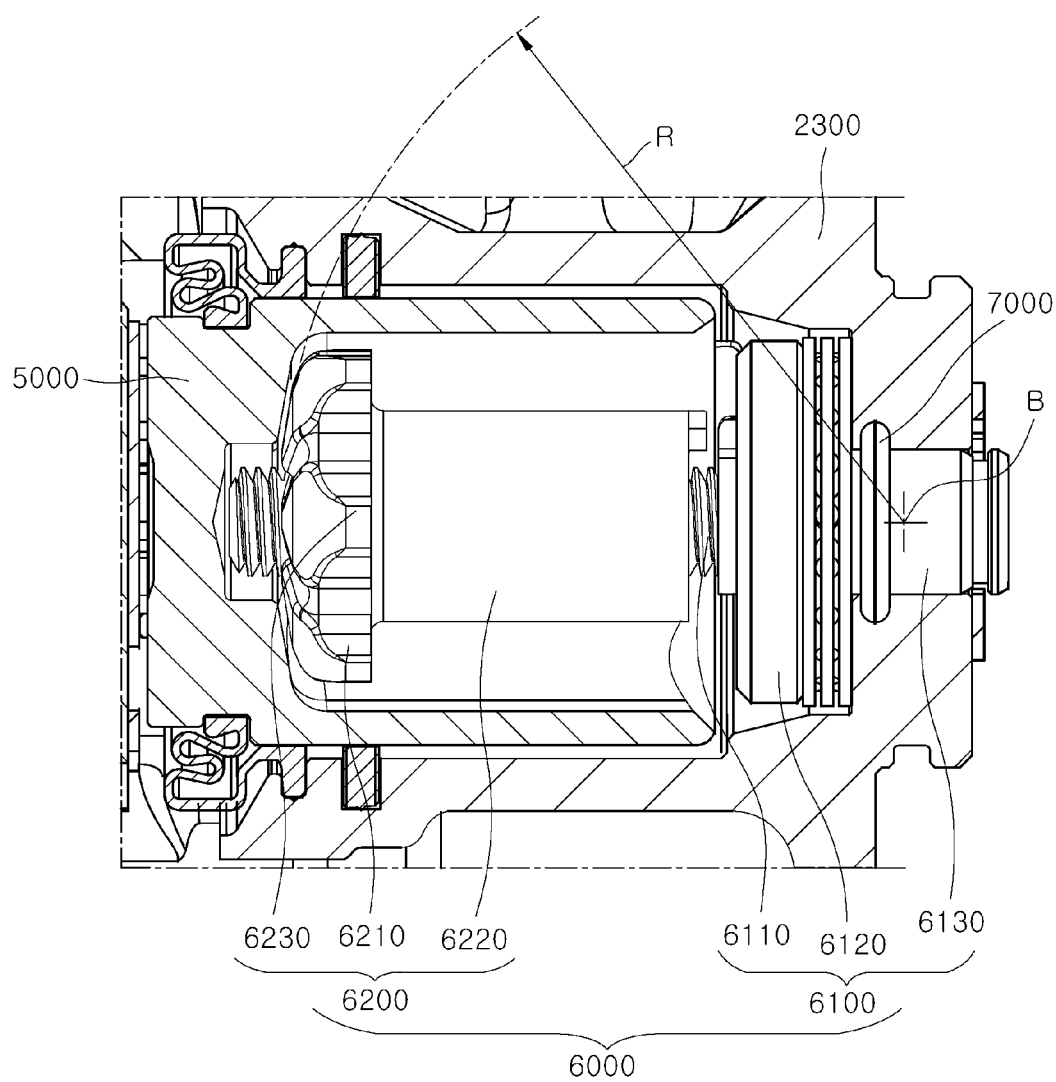
FIG. 3 is a cross-sectional view schematically illustrating a state in which the nut part according to the embodiment of the present disclosure is installed.
Figure 4:
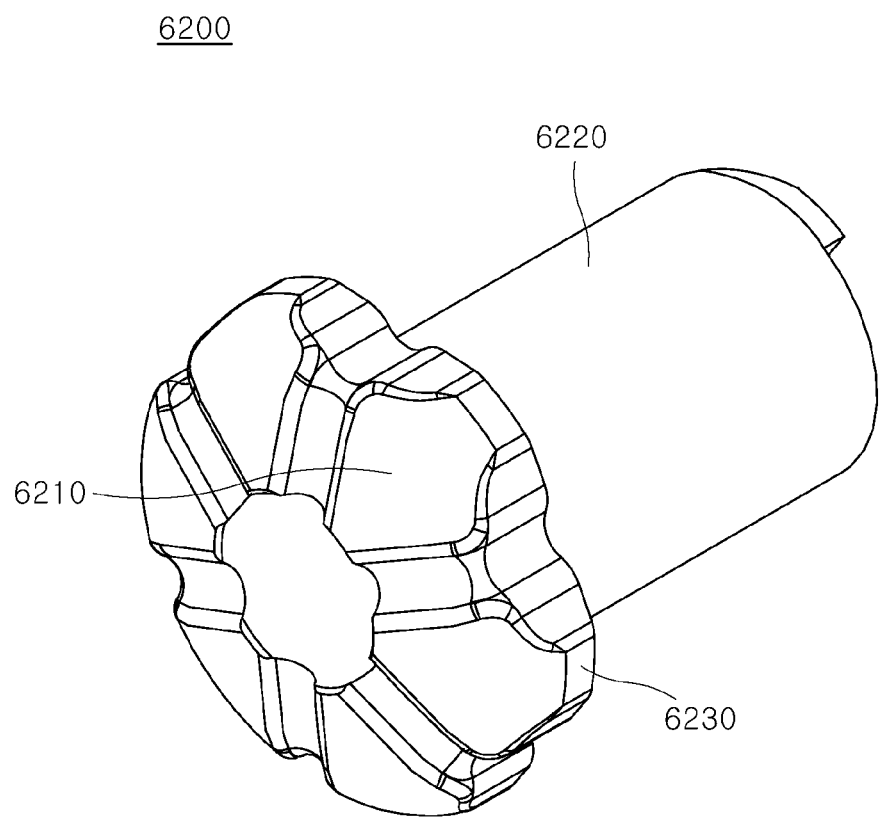
FIG. 4 is a perspective view schematically illustrating a configuration of a nut part according to the embodiment of the present disclosure.

FIG. 3 is a cross-sectional view schematically illustrating a state in which the nut part according to the embodiment of the present disclosure is installed, and FIG. 4 is a perspective view schematically illustrating a configuration of the nut part according to the embodiment of the present disclosure.

Referring to FIGS. 3 and 4, the nut part 6200 according to the embodiment of the present disclosure includes a head portion 6210, a connection portion 6220, and an anti-rotation portion 6230.

The head portion 6210 defines a front external appearance of the nut part 6200 and faces the inner rear surface of the piston module 5000. A front surface of the head portion 6210 has a convex shape and is in rollable contact with the rear surface of the piston module 5000 in the first direction D. When the inner surface of the piston module 5000 is curved, a curvature of the front surface of the head portion 6210 may correspond in value to a curvature of the inner rear surface of the piston module 5000. Upper and lower surfaces of the head portion 6210 are spaced apart from the inner surface of the piston module 5000 at predetermined intervals. Therefore, the head portion 6210 may smoothly rotate in the first direction D without interfering with the rear surface of the piston module 5000. A center B of curvature of the head portion 6210 is disposed rearward from the sealing member 7000 to be described below on the basis of a case in which the head portion 6210 is in contact with the rear surface of the piston module 5000. Therefore, the head portion 6210 may allow the coupling portion 6130 to rotate integrally with the cylinder part 2300, thereby preventing the portion between the coupling portion 6130 and the cylinder part 2300 from being expanded. In consideration of abrasion of the pad plate module 3000, a radius R of curvature of the head portion 6210, i.e., a distance from the center B of curvature to a front surface of the head portion 6210 may be longer, by a predetermined length, than a distance from the sealing member 7000 to the front surface of the head portion 6210. In this case, for example, the predetermined length may be about 20 mm.

The connection portion 6220 extends from the rear surface of the head portion 6210 and is connected to the spindle part 6100. The connection portion 6220 has a screw thread formed on an inner peripheral surface thereof and is thread-coupled to the spindle part 6100, more specifically, the outer peripheral surface of the bolt portion 6110. The connection portion 6220 moves the head portion 6210 forward or rearward in conjunction with the rotation of the spindle part 6100.

The anti-rotation portion 6230 is disposed at a lateral side of the head portion 6210 and prevents an axial rotation of the head portion 6210 by interfering with the inner surface of the piston module 5000. The anti-rotation portion 6230 according to the embodiment of the present disclosure may have a planar shape disposed along a periphery of a lateral side of the head portion 6210. The anti-rotation portion 6230 is disposed to be perpendicular to the radial direction of the head portion 6210. The anti-rotation portion 6230 is in surface contact with the in the left and right surfaces of the piston module 5000, thereby preventing the head portion 6210 from being axially rotated by the spindle part 6100. Therefore, the anti-rotation portion 6230 may allow the nut part 6200 to be rectilinearly moved by the rotation of the spindle part 6100.

The sealing member 7000 is provided between the cylinder part 2300 and the spindle part 6100 and prevents a leak of oil stored in the cylinder part 2300. The sealing member 7000 according to the embodiment of the present disclosure may be provided in the form of an O-ring that seals a portion between the coupling portion 6130 and a rear inner surface of the cylinder part 2300.

Hereinafter, an operation of a parking brake apparatus 1 for a vehicle according to the embodiment of the present disclosure will be described in detail.

Figure 5:
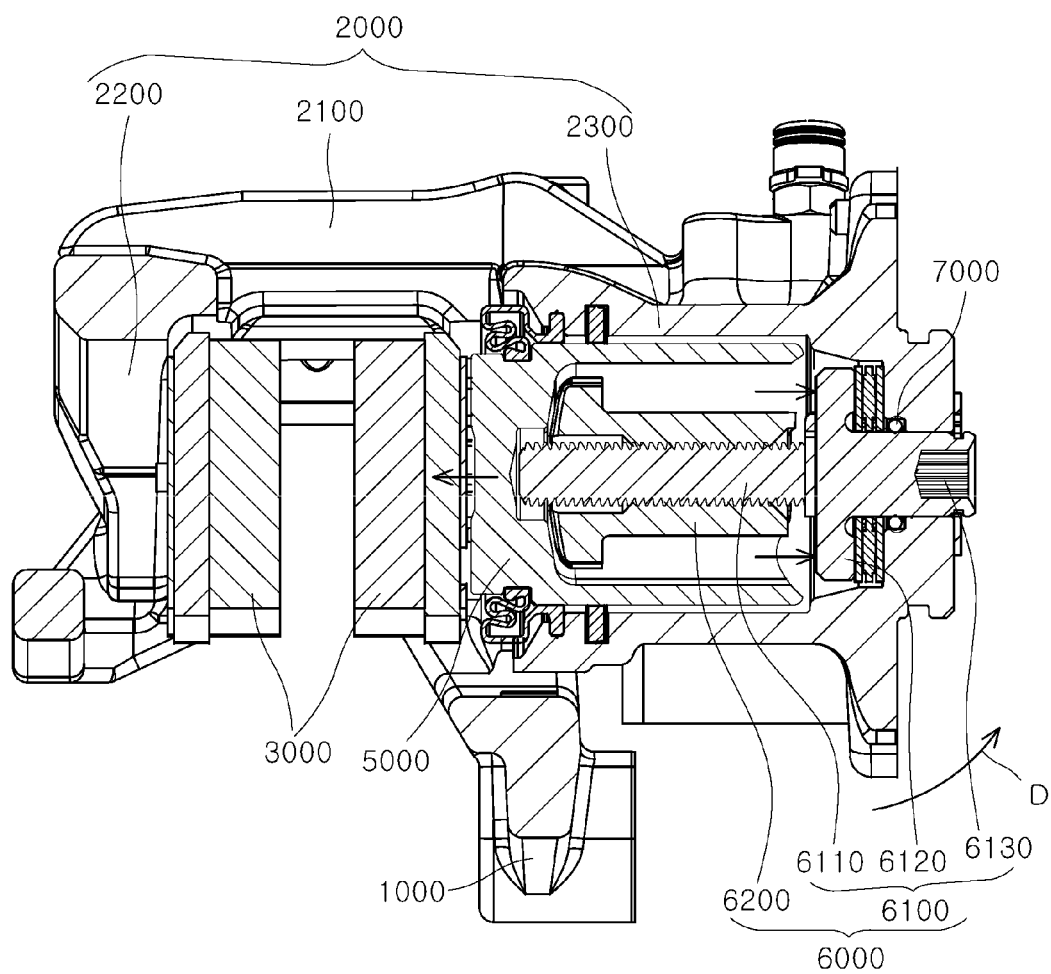
FIGS. 5 and 6 are operational views schematically illustrating an operating process of the parking brake apparatus for a vehicle according to the embodiment of the present disclosure.
Figure 6:
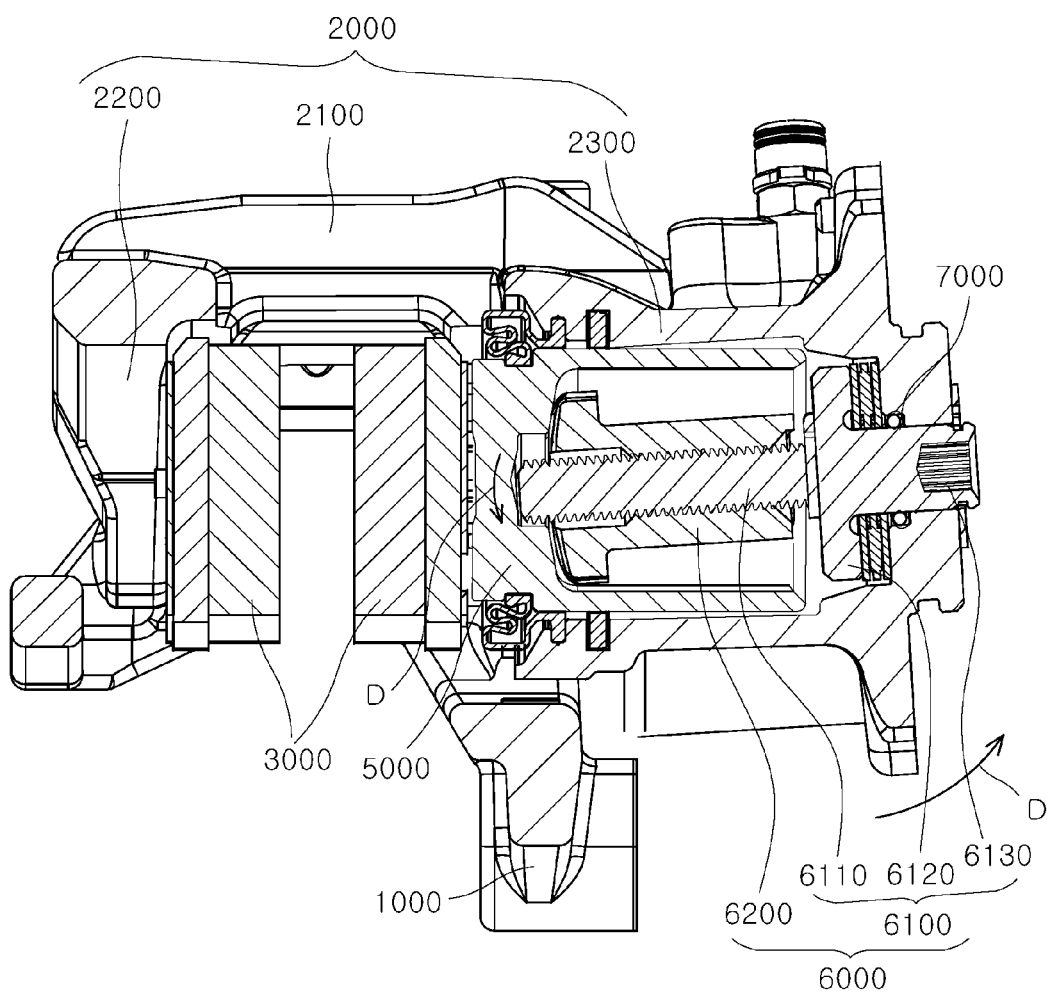

FIGS. 5 and 6 are operational views schematically illustrating an operating process of the parking brake apparatus 1 for a vehicle according to the embodiment of the present disclosure.

Referring to FIGS. 1 to 6, to apply the braking force to the vehicle, the spindle part 6100 is axially rotated toward one side by the rotational force transmitted from the actuator 4000.

The nut part 6200 thread-coupled to the outer peripheral surface of the spindle part 6100 moves forward in conjunction with the axial rotation of the spindle part 6100.

As the nut part 6200 moves forward by a predetermined distance or more, the front surface of the head portion 6210 comes into contact with the inner rear surface of the piston module 5000 and presses the piston module 5000 forward.

The piston module 5000 is moved to the front side of the cylinder part 2300 by the pressing force and brings the pad plate module 3000 disposed therein into contact with the disc 2.

As the piston module 5000 presses the pad plate module 3000 disposed therein, the reaction force is applied to the piston module 5000 in the direction opposite to the pressing force.

The caliper module 2000 is slid rearward by the reaction force, and the finger part 2200 brings the pad plate module 3000 disposed at the outside into contact with the disc 2. Therefore, the pair of pad plate modules 3000 generates the braking force by using the frictional force with the two opposite sides of the disc 2.

Meanwhile, the reaction force applied to the piston module 5000 is transmitted to the cylinder part 2300 sequentially through the piston module 5000, the nut part 6200, and the spindle part 6100.

The reaction force transmitted to the cylinder part 2300 presses the rear surface of the cylinder part 2300 in a perpendicular direction, such that torque for rotating the cylinder part 2300 in the first direction D is applied to the cylinder part 2300.

The cylinder part 2300 is deformed while being rotated in the first direction D by the torque.

The piston module 5000, which defines a clearance having a predetermined interval with the inner surface of the cylinder part 2300, is kept in a horizontal state.

The head portion 6210, which is in rollable contact with the inner rear surface of the piston module 5000, rotates in the first direction D together with the cylinder part 2300. In this case, a curvature of the front surface of the head portion 6210 may correspond in value to a curvature of the inner rear surface of the piston module 5000, and the upper and lower surfaces of the head portion 6210 may be spaced apart from the inner upper and lower surfaces of the piston module 5000 at predetermined intervals. Therefore, the head portion 6210 may roll in the first direction D without separate interference in the state in which the head portion 6210 is in contact with the inner rear surface of the piston module 5000.

As the head portion 6210 rolls in the first direction D, the connection portion 6220, which is integrally connected to the head portion 6210, and the spindle part 6100, which is thread-coupled to the connection portion 6220, also rotate in the first direction D together with the head portion 6210. Meanwhile, since the connection portion 6220 rotates integrally with the spindle part 6100, it is possible to prevent a high load from being applied between the connection portion 6220 and the spindle part 6100 and prevent deterioration in efficiency due to the fitting between the connection portion 6220 and the spindle part 6100.

Since the center B of curvature of the head portion 6210 is positioned rearward from the sealing member 7000, the transmission module 6000 rotates together with the cylinder part 2300 in the first direction D based on the center B of curvature. Therefore, it is possible to prevent the expansion of the gap between the cylinder part 2300 and the coupling portion 6130 disposed at the rear side based on the center B of curvature.

Hereinafter, a configuration of the actuator 4000 according to the embodiment of the present disclosure will be described in detail.

Figure 7:
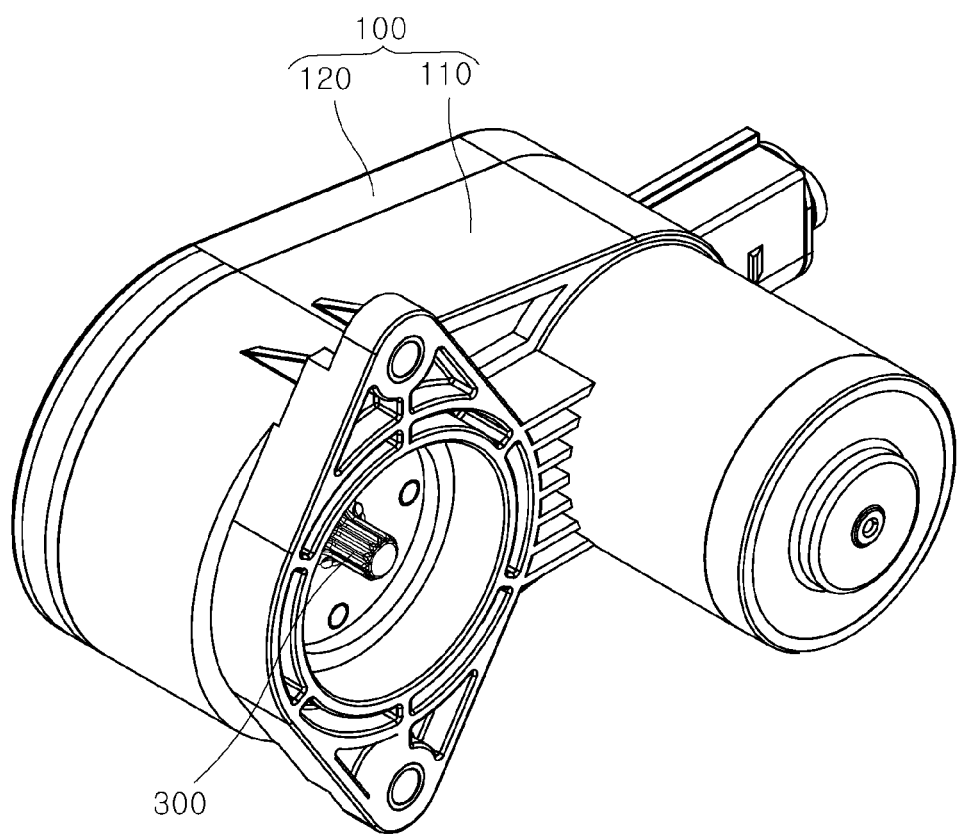
FIG. 7 is a perspective view schematically illustrating a configuration of an actuator according to the embodiment of the present disclosure.
Figure 8:
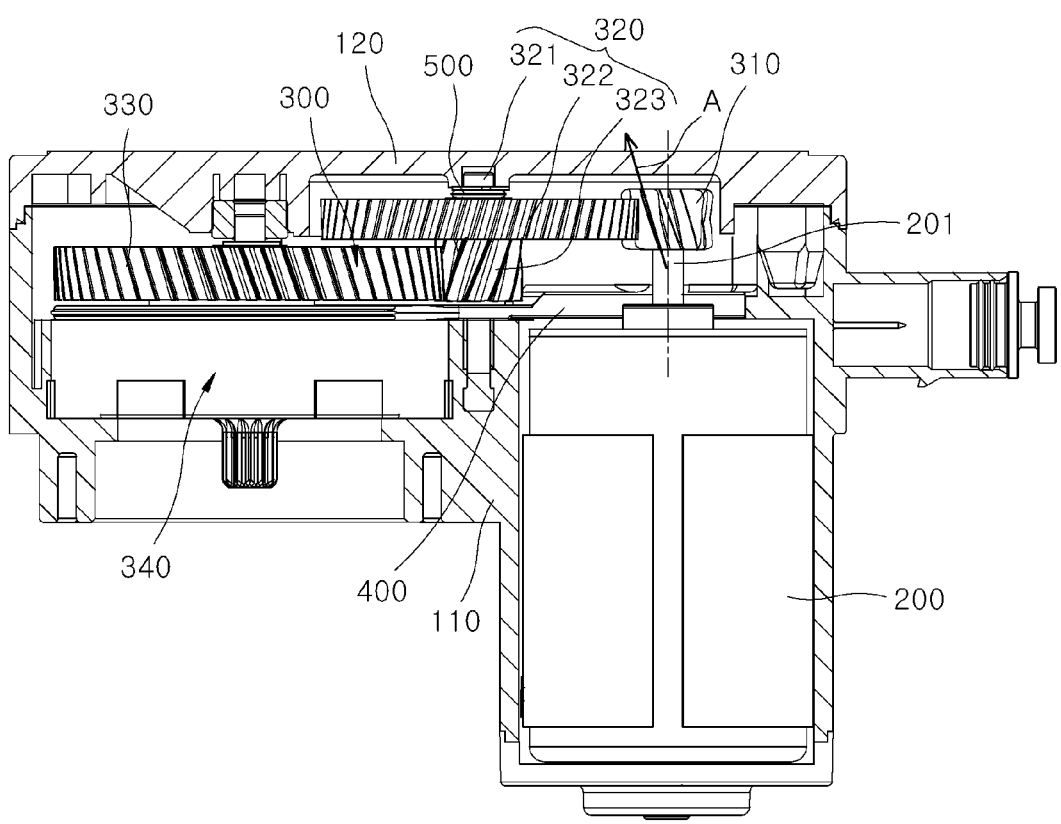
FIG. 8 is a cross-sectional view schematically illustrating the configuration of the actuator according to the embodiment of the present disclosure.
Figure 9:
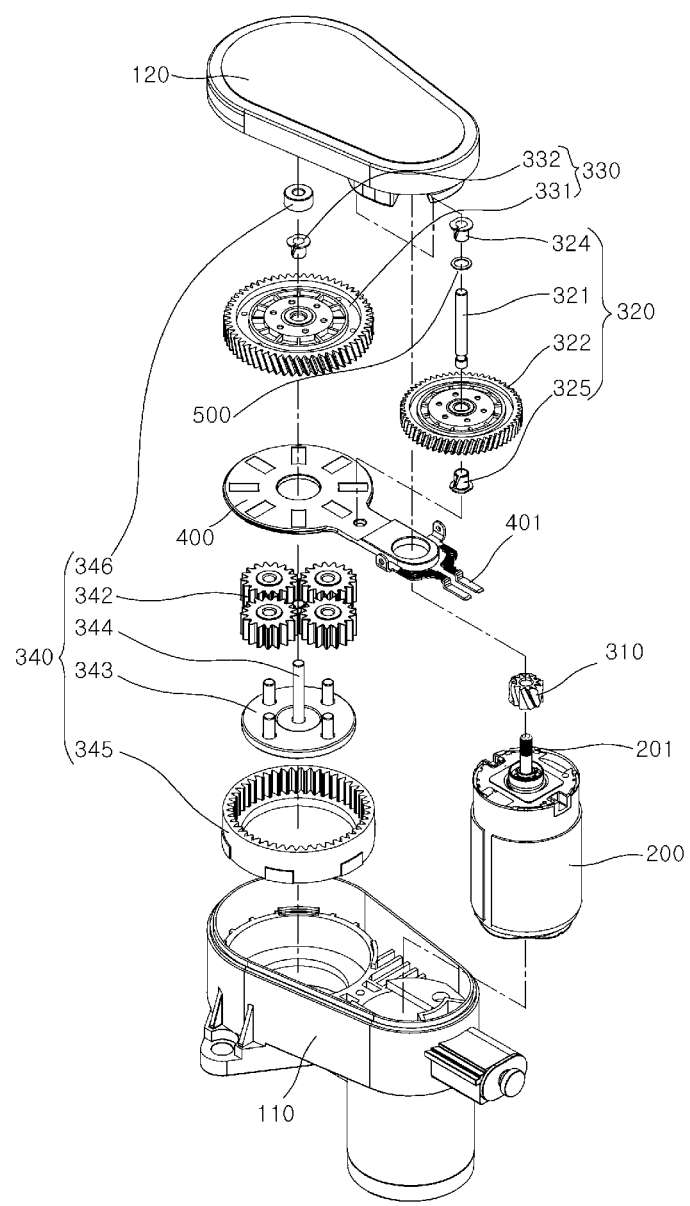
FIGS. 9 and 10 are exploded perspective views schematically illustrating the configuration of the actuator according to the embodiment of the present disclosure.
Figure 10:
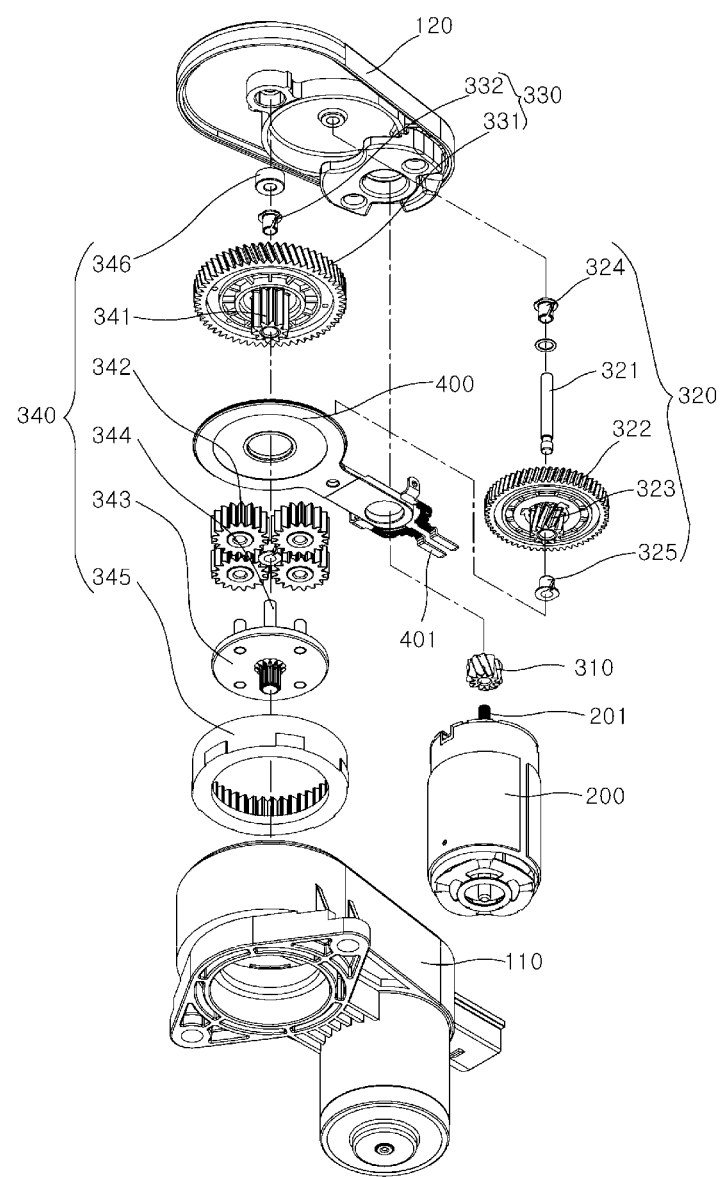

FIG. 7 is a perspective view schematically illustrating a configuration of an actuator according to the embodiment of the present disclosure, FIG. 8 is a cross-sectional view schematically illustrating the configuration of the actuator according to the embodiment of the present disclosure, and FIGS. 9 and 10 are exploded perspective views schematically illustrating the configuration of the actuator according to the embodiment of the present disclosure.

Referring to FIGS. 7 to 10, the actuator 4000 according to the embodiment of the present disclosure includes a housing 100, a drive part 200, a power transmission part 300, a fixing part 400, and an anti-collision part 500.

The housing 100 defines a schematic external appearance of the actuator 4000 according to the embodiment of the present disclosure. The housing 100 has therein a space in which the drive part 200, the power transmission part 300, the fixing part 400, and the anti-collision part 500 may be installed. The housing 100 may be openable and closable to easily install components in the housing 100 and easily manage the components installed in the housing 100. The housing 100 according to the embodiment of the present disclosure may have a vacant interior and include a housing main body 110 opened at one side thereof, and a cover part 120 detachably coupled to the open side of the housing main body 110 and configured to open or close the interior of the housing main body 110.

The drive part 200 is installed at one side of the housing 100 and generates power by being supplied with electric power from the outside. The drive part 200 may be supplied with the electric power by being electrically connected to a terminal part 401 installed in the fixing part 400 to be described below. For example, the drive part 200 according to the embodiment of the present disclosure may be an electric motor for generating a rotational driving power by being supplied with electric power. A first rotary shaft 201 may be provided at one side of the drive part 200, extend into the housing 100, and rotate.

The power transmission part 300 are installed in the housing 100. The power transmission part 300 rotate in conjunction with the operation of the drive part 200 and transmit power to the spindle part 6100 and the piston module 5000.

The power transmission part 300 according to the embodiment of the present disclosure include a first power transmission part 310, a second power transmission part 320, a third power transmission part 330, and a fourth power transmission part 340.

The first power transmission part 310 is rotated by the power transmitted from the drive part 200. The first rotary shaft 201 of the drive part 200 is inserted into the first power transmission part 310 according to the embodiment of the present disclosure. The first power transmission part 310 is disposed coaxially with the first rotary shaft 201 and rotated integrally with the first rotary shaft 201. The first power transmission part 310 may be provided in the form of a helical gear having teeth formed on an outer peripheral surface thereof. Therefore, a contact area between the first power transmission part 310 and the second power transmission part 320 to be described below increases, which makes it possible to transmit a higher force and reduce noise occurring when the first and second power transmission part 310 and 320 rotate. The tooth of the first power transmission part 310 may be inclined at a torsional angle in a second direction D. In this case, for example, the second direction A may be a direction inclined leftward (based on FIG. 8) at a predetermined angle with respect to a centerline of the first power transmission part 310. Therefore, the first power transmission part 310 may apply an axial force downward (based on FIG. 8) to the second power transmission part 320.

The second power transmission part 320 engages with the first power transmission part 310 and rotates in conjunction with the rotation of the first power transmission part 310.

The second power transmission part 320 according to the embodiment of the present disclosure includes a second rotary shaft 321, a large-diameter gear 322, a small-diameter gear 323, a first friction reducer 324, and a second friction reducer 325.

The second rotary shaft 321 is fixed to the housing 100 and penetrates the large-diameter gear 322 and the small-diameter gear 323 which will be described below. The second rotary shaft 321 according to the embodiment of the present disclosure is provided in the form of a rod and has two opposite ends respectively fixed to the housing main body 110 and the cover part 120. The second rotary shaft 321 is fixed so as not to rotate relative to the housing 100 when the large-diameter gear 322 and the small-diameter gear 323 rotate. A longitudinal direction of the second rotary shaft 321 is disposed in parallel with a longitudinal direction of the first rotary shaft 201.

The large-diameter gear 322 rotates about the second rotary shaft 321 and engages with the first power transmission part 310. The second rotary shaft 321 is inserted into the large-diameter gear 322, and the large-diameter gear 322 is disposed coaxially with the second rotary shaft 321. The large-diameter gear 322 may be provided in the form of a helical gear having teeth formed on an outer peripheral surface thereof. The outer peripheral surface of the large-diameter gear 322 engages with the outer peripheral surface of the first power transmission part 310, such that the large-diameter gear 322 rotates in conjunction with the rotation of the first power transmission part 310. The tooth of the large-diameter gear 322 may be inclined at a torsional angle in a direction opposite to the second direction A. That is, the tooth of the large-diameter gear 322 is inclined rightward (based on FIG. 8) at a predetermined torsional angle with respect to a centerline of the second power transmission part 320.

The small-diameter gear 323 extends from the large-diameter gear 322 and has a smaller diameter than the large-diameter gear 322. The small-diameter gear 323 is integrally connected to the large-diameter gear 322 and rotated together with the large-diameter gear 322. The small-diameter gear 323 engages with a third power transmission member 331 of the third power transmission part 330 and transmits rotational power to the third power transmission part 330. The small-diameter gear 323 according to the embodiment of the present disclosure is provided in the form of a helical gear extending downward (based on FIG. 8) from a central portion of the large-diameter gear 322. The small-diameter gear 323 is disposed coaxially with the large-diameter gear 322 and rotated about the second rotary shaft 321. The small-diameter gear 323 may be integrally connected to an inner peripheral surface of the large-diameter gear 322. Alternatively, the small-diameter gear 323 may be integrally connected to a rear surface of the large-diameter gear 322. Like the large-diameter gear 322, the tooth of the small-diameter gear 323 is inclined at a torsional angle in the direction opposite to the second direction A. The small-diameter gear 323 has a smaller diameter than the large-diameter gear 322 so that the small-diameter gear 323 and the large-diameter gear 322 collectively define an approximately T-shaped longitudinal section. Therefore, the small-diameter gear 323 may greatly increase a gear ratio despite a narrow installation space.

The first friction reducer 324 is disposed between the large-diameter gear 322 and the second rotary shaft 321 and supports the large-diameter gear 322 so that the large-diameter gear 322 is rotatable relative to the second rotary shaft 321. More specifically, the first friction reducer 324 fills a clearance between the large-diameter gear 322 and the second rotary shaft 321, thereby inhibiting a radial movement of the large-diameter gear 322. An outer peripheral surface of the first friction reducer 324 is in sliding contact with the inner peripheral surface of the large-diameter gear 322, thereby reducing a frictional force caused by the rotational motion of the large-diameter gear 322.

Figure 11:
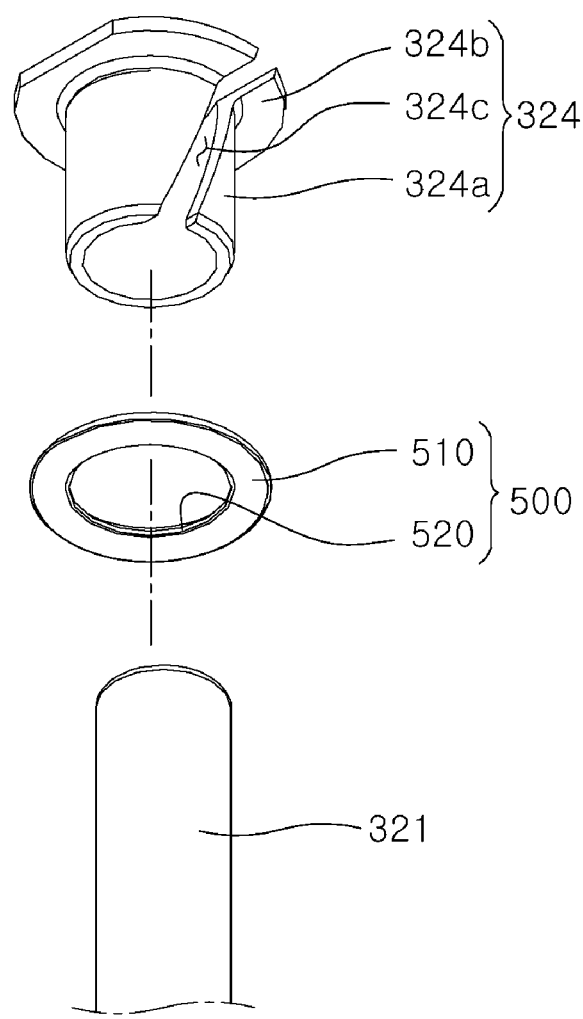
FIG. 11 is an enlarged perspective view schematically illustrating configurations of a first friction reducer and an anti-collision part according to the embodiment of the present disclosure.

FIG. 11 is an enlarged perspective view schematically illustrating configurations of a first friction reducer and an anti-collision part according to the embodiment of the present disclosure.

Referring to FIG. 11, the first friction reducer 324 according to the embodiment of the present disclosure includes an insertion portion 324a, a support portion 324b, and a cut-out portion 324c.

The second rotary shaft 321 is inserted into the insertion portion 324a. An outer peripheral surface of the insertion portion 324a is in sliding contact with the inner peripheral surface of the large-diameter gear 322. The insertion portion 324a according to the embodiment of the present disclosure has an approximately cylindrical shape. The second rotary shaft 321 is inserted into the insertion portion 324a, such that the insertion portion 324a surrounds the second rotary shaft 321. The insertion portion 324a is fixed and press-fitted with an outer peripheral surface of the second rotary shaft 321, such that a movement of the insertion portion 324a relative to the second rotary shaft 321 is prevented. An outer surface of the insertion portion 324a is made of a material having a low frictional coefficient or a lubricating substance such as oil is applied onto the outer surface of the insertion portion 324a, such that the outer surface of the insertion portion 324a is in sliding contact with the inner peripheral surface of the large-diameter gear 322. An insertion groove may be formed in an outer surface of the insertion portion 324a. The insertion groove is recessed into the insertion portion 324a, and a movement prevention portion 520 to be described below may be inserted into the insertion groove.

The support portion 324b extends in a radial direction of the insertion portion 324a, adjoins the housing 100, and supports the insertion portion 324a. The support portion 324b according to the embodiment of the present disclosure is disposed at an upper end of the insertion portion 324a and provided in the form of a circular plate extending in the radial direction of the insertion portion 324a. An upper surface of the support portion 324b is in contact with an inner surface of the cover part 120 of the housing 100 and supports the insertion portion 324a.

The cut-out portion 324c penetrates the insertion portion 324a and induces deformation of the insertion portion 324a when the second rotary shaft 321 is inserted into the insertion portion 324a. More specifically, the cut-out portion 324c is made by forming a cut-out space in the insertion portion 324a. When the second rotary shaft 321 is inserted into the insertion portion 324a, the cut-out portion 324c induces a diameter of the insertion portion 324a to increase to correspond to a diameter of the second rotary shaft 321. Therefore, the second rotary shaft 321 may be more smoothly inserted into the insertion portion 324a, and the insertion portion 324a may be installed on the second rotary shaft 321 that may have various diameters. The cut-out portion 324c according to the embodiment of the present disclosure is provided in the form of a hole made by cutting the insertion portion 324a in the longitudinal direction. The cut-out portion 324c may be inclined at a predetermined angle with respect to the longitudinal direction of the insertion portion 324a.

The second friction reducer 325 is disposed between the small-diameter gear 323 and the second rotary shaft 321 and supports the small-diameter gear 323 so that the small-diameter gear 323 is rotatable relative to the second rotary shaft 321. A specific shape of the second friction reducer 325 may be identical to the shape of the first friction reducer 324. However, the second friction reducer 325 is not limited to the shape, and the shape of the second friction reducer 325 may be variously changed in design within the technical spirit of the shape of the second friction reducer 325 for supporting the small-diameter gear 323 so that the small-diameter gear 323 is rotatable.

The third power transmission part 330 engages with the second power transmission part 320 and rotates in the same direction as the first power transmission part 310 in conjunction with the rotation of the second power transmission part 320. The third power transmission part 330 transmits the rotational force to the fourth power transmission part 340, to be described below, while rotating. The third power transmission part 330 engages with the second power transmission part 320 so that a direction of an axial force applied to the second power transmission part 320 by the third power transmission part 330 is opposite to a direction of an axial force applied to the second power transmission part 320 by the first power transmission part 310. Therefore, the axial force applied to the second power transmission part 320 by the first power transmission part 310 and the axial force applied to the second power transmission part 320 by the third power transmission part 330 may be offset. Therefore, it is possible to prevent the second power transmission part 320 from excessively moving in the axial direction.

The third power transmission part 330 according to the embodiment of the present disclosure includes the third power transmission member 331 and a third friction reducer 332.

A third rotary shaft 344 of the fourth power transmission part 340, which will be described below, is inserted into the third power transmission member 331. The third power transmission member 331 may be provided in the form of a helical gear having teeth formed on an outer peripheral surface thereof. The tooth of the third power transmission part 331 may be inclined at a torsional angle in the second direction A. For example, like the first power transmission part 310, the second direction A may be a direction inclined leftward (based on FIG. 8) at a predetermined angle with respect to a centerline of the third power transmission member 331. Therefore, the third power transmission member 331 may apply the axial force upward (based on FIG. 8) to the second power transmission part 320.

The third friction reducer 332 is disposed between the third power transmission member 331 and the third rotary shaft 344 and supports the third power transmission member 331 so that the third power transmission member 331 is rotatable relative to the third rotary shaft 344. A specific shape of the third friction reducer 332 may be identical to the shape of the first friction reducer 324. However, the third friction reducer 332 is not limited to the shape, and the shape of the third friction reducer 332 may be variously changed in design within the technical spirit of the shape of the third friction reducer 332 for supporting the third power transmission member 331 so that the third power transmission member 331 is rotatable.

The fourth power transmission part 340 is connected to the third power transmission part 330 and rotated in conjunction with the rotation of the third power transmission part 330. The fourth power transmission part 340 serves to finally transmit the power, which is generated by the drive part 200, to the spindle part 6100 that presses the piston module 5000. The fourth power transmission part 340 according to the embodiment of the present disclosure includes a sun gear 341, planet gears 342, a carrier 343, the third rotary shaft 344, a ring gear 345, and a fourth friction reducer 346.

The sun gear 341 extends from the third power transmission part 330 and rotates together with the third power transmission part 330. The sun gear 341 according to the embodiment of the present disclosure is disposed on a central portion of the third power transmission member 331 and perpendicularly extends downward (based on FIGS. 8 and 10) from the third power transmission member 331. The sun gear 341 may be provided in the form of a spur gear having teeth formed on an outer peripheral surface thereof so as to engage with the planet gears 342 to be described below. The sun gear 341 is concentric with the rotation center of the third power transmission member 331, such that the sun gear 341 rotates about the same rotation axis as the third power transmission member 331. The sun gear 341 may be formed integrally with the third power transmission member 331. Alternatively, the sun gear 341 may be provided separately from the third power transmission member 331 and coupled to and integrated with the third power transmission member 331.

The planet gears 342 engage with the sun gear 341, rotate about the rotation axes thereof, and revolve around the sun gear 341. The planet gear 342 may be provided in the form of a spur gear having teeth formed on an outer peripheral surface thereof and engages with an outer peripheral surface of the sun gear 341. The planet gear 342 is provided in plural, and the plurality of planet gears 342 is disposed around the sun gear 341. The number of planet gears 342 according to the embodiment of the present disclosure is four, for example. However, the present disclosure is not limited thereto, and the number of planet gears 342 may be three or less or five or more. The plurality of planet gears 342 is disposed at an equal angle about the rotation center of the sun gear 341. The plurality of planet gears 342 may rotate about the respective rotation axes thereof or revolve around the third rotary shaft 344 in conjunction with the rotation of the sun gear 341.

The carrier 343 supports the planet gears 342 and rotates in conjunction with the revolution of the planet gears 342. When the planet gears 342 revolve, the carrier 343 rotates the spindle part 6100 while rotating together with the planet gears 342.

Planet gear rotary shafts extend from one side (an upper side based on FIGS. 9 and 10) of the carrier 343 and are respectively inserted into the planet gears 342. The planet gear rotary shaft is provided in plural, and the plurality of planet gear rotary shafts is equal in number to the planet gears 342. The planet gear rotary shaft penetrates a central portion of the planet gear 342. Therefore, the planet gear 342 may rotate about the planet gear rotary shaft. The planet gear rotary shafts are disposed at positions spaced apart from the center of the carrier 343 at predetermined distances. The plurality of planet gear rotary shafts may be disposed at an equal interval in a circumferential direction of the carrier 343. Therefore, the carrier 343 may axially rotate in conjunction with the revolution of the planet gears 342.

An output shaft coupled to the spindle extends from the other side (a lower side based on FIGS. 9 and 10) of the carrier 343. The output shaft has spline teeth formed on an outer peripheral surface thereof and is coupled to an inner peripheral surface of the spindle by means of a spline structure.

The third rotary shaft 344 extends from the carrier 343 and supports the third power transmission part 330. The third rotary shaft 344 according to the embodiment of the present disclosure is provided in the form of a rod extending to one side (the upper side based on FIGS. 9 and 10) of the carrier 343. An end of the third rotary shaft 344 is inserted into the cover part 120 of the housing 100. The third rotary shaft 344 is integrally connected to the carrier 343 and rotates relative to the housing 100 when the carrier 343 rotates. The third rotary shaft 344 penetrates a central axis of the third power transmission member 311 and supports the third power transmission member 311.

The ring gear 345 has a hollow ring shape. The ring gear 345 has teeth formed on an inner peripheral surface thereof, and the inner peripheral surface of the ring gear 345 engages with the outer peripheral surfaces of the planet gears 342. The ring gear 345 may rotate together with the planet gears 342. Alternatively, when the planet gears 342 rotate, the ring gear 345 may be fixed to adjust a gear ratio at which the power is transmitted through the output shaft of the carrier 343.

The fourth friction reducer 346 is disposed between the housing 100 and the third rotary shaft 344 and supports the third rotary shaft 344 so that the third rotary shaft 344 is rotatable relative to the housing 100. The fourth friction reducer 346 according to the embodiment of the present disclosure has a hollow ring shape, and an outer peripheral surface of the fourth friction reducer 346 is fixed to and press-fitted with the cover part 120 of the housing 100. An inner peripheral surface of the fourth friction reducer 346 is in sliding contact with an outer peripheral surface of the third rotary shaft 344 and supports the third rotary shaft 344 so that the third rotary shaft 344 is rotatable, thereby reducing a frictional force caused by the rotational motion of the third rotary shaft 344.

The fixing part 400 is installed in the housing 100 and supports the first rotary shaft 201, the second rotary shaft 321, and the third rotary shaft 344. The fixing part 400 according to the embodiment of the present disclosure has an approximately plate shape and is installed between the third power transmission member 331 and the planet gears 342. The fixing part 400 is disposed to be perpendicular to the longitudinal direction of the first rotary shaft 201, the second rotary shaft 321, and the third rotary shaft 344. The fixing part 400 has a through-hole having a diameter corresponding to a diameter of the first rotary shaft 201, a diameter of the second rotary shaft 321, and a diameter of the third rotary shaft 344. The first rotary shaft 201, the second rotary shaft 321, and the third rotary shaft 344 may be supported by being inserted into the through-hole.

The terminal parts 401 may be installed on the fixing part 400 and electrically connected to the drive part 200. A pair of terminal parts 401 may be provided, and the terminal parts 401 are respectively connected to a positive (+) electrode and a negative (−) electrode of the drive part 200. The terminal parts 401 extend from the fixing part 400 and are connected to a connector installed at one side of the housing 100.

The anti-collision part 500 is disposed between the housing 100 and the power transmission part 300 and prevents a collision between the housing 100 and the power transmission part 300. More specifically, the anti-collision part 500 provides a buffer means between the housing 100 and the power transmission part 300 and prevents the second power transmission part 320 from colliding directly with the housing 100 by being moved toward the housing 100 by an instantaneous axial force during a process in which the power transmission parts 300 transmit power. Therefore, the anti-collision part 500 may prevent the occurrence of noise caused by the collision between the second power transmission part 320 and the housing 100 and prevent damage to the second power transmission part 320 due to the repeated collision.

Figure 12:
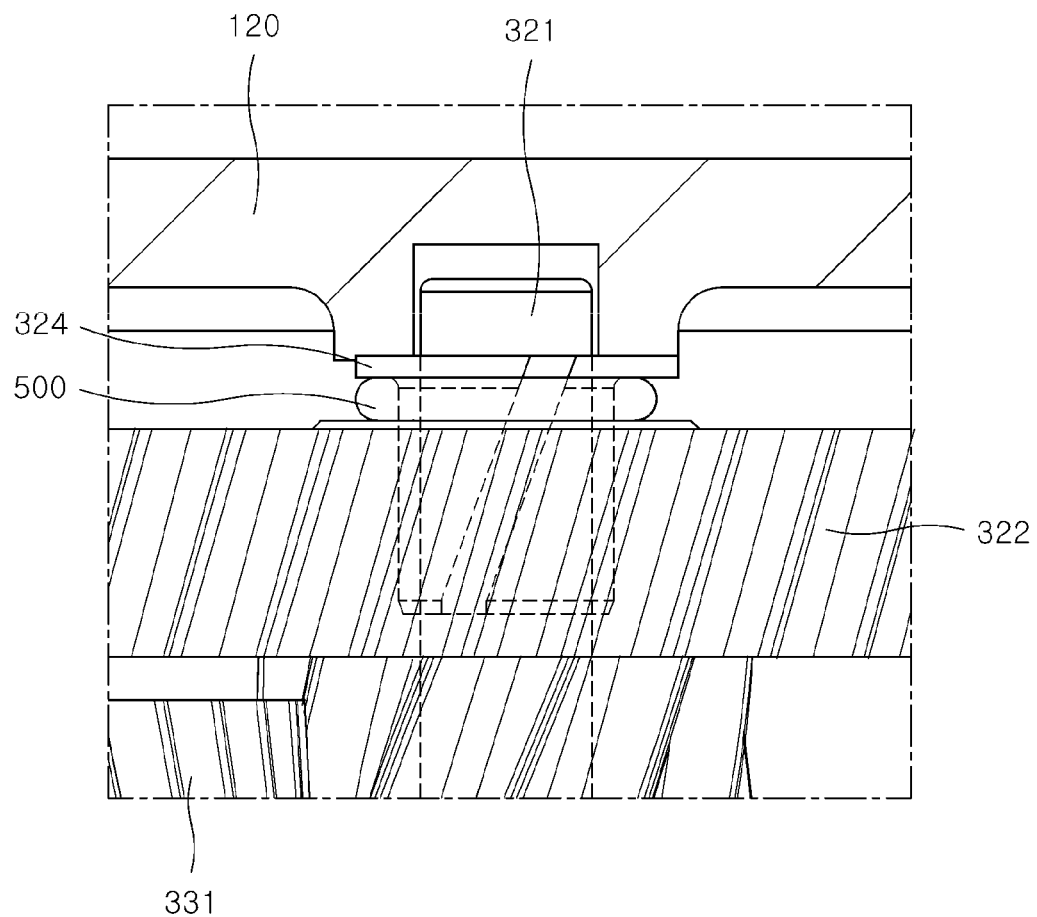
FIGS. 12 and 13 are views schematically illustrating an installed state of the anti-collision part and a coupling relationship between the anti-collision part and the first friction reducer according to the embodiment of the present disclosure.
Figure 13:
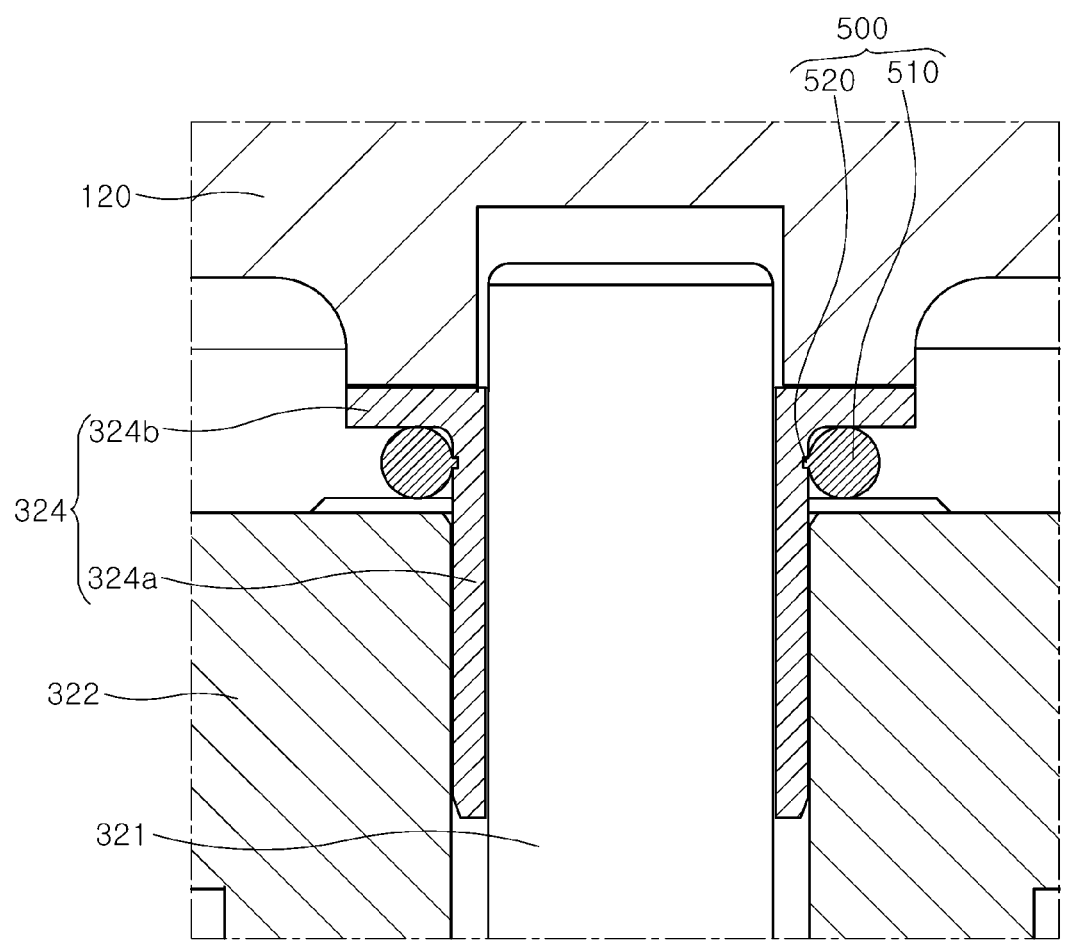

FIGS. 12 and 13 are views schematically illustrating an installed state of the anti-collision part and a coupling relationship between the anti-collision part and the first friction reducer according to the embodiment of the present disclosure.

Referring to FIGS. 12 and 13, the anti-collision part 500 according to the embodiment of the present disclosure includes an anti-collision member 510 and the movement prevention portion 520.

The anti-collision member 510 is disposed between the second power transmission part 320 and the first friction reducer 324 and surrounds the insertion portion 324a. The anti-collision member 510 has an elastic restoring force and is elastically deformed as the second power transmission part 320 moved toward the housing 100. Therefore, the anti-collision member 510 may absorb impact applied from the second power transmission part 320 because of the instantaneous axial force, thereby preventing direct contact between the second power transmission part 320 and the housing 100. When the axial force applied to the second power transmission part 320 is eliminated, the elastic restoring force of the anti-collision member 510 may return the second power transmission part 320 to an original position. The anti-collision member 510 according to the embodiment of the present disclosure is provided in the form of a ring made of an elastic material such as rubber or silicone. The anti-collision member 510 is disposed so that two opposite surfaces thereof respectively face the support portion 324b and the large-diameter gear 322. An inner peripheral surface of the anti-collision member 510 is in close contact with the outer peripheral surface of the insertion portion 324a in a state in which the anti-collision member 510 surrounds the insertion portion 324a. Therefore, the anti-collision member 510 may prevent the insertion portion 324a from arbitrarily spreading out after the second rotary shaft 321 is inserted into the insertion portion 324a.

The movement prevention portion 520 protrudes from the anti-collision member 510 and is inserted into the insertion portion 324a, thereby preventing the anti-collision member 510 from moving relative to the insertion portion 324a.

The movement prevention portion 520 according to the embodiment of the present disclosure is provided in the form of a protrusion horizontally protruding from the inner peripheral surface of the anti-collision member 510. The movement prevention portion 520 is inserted into the insertion groove formed in the outer surface of the insertion portion 324a and prevents the anti-collision member 510 from moving in the longitudinal direction of the insertion portion 324a. Therefore, the movement prevention portion 520 may stably fix a position of the anti-collision member 510.

Hereinafter, an operating process of the brake apparatus 1 for a vehicle according to the embodiment of the present disclosure will be described in detail.

Figure 14:
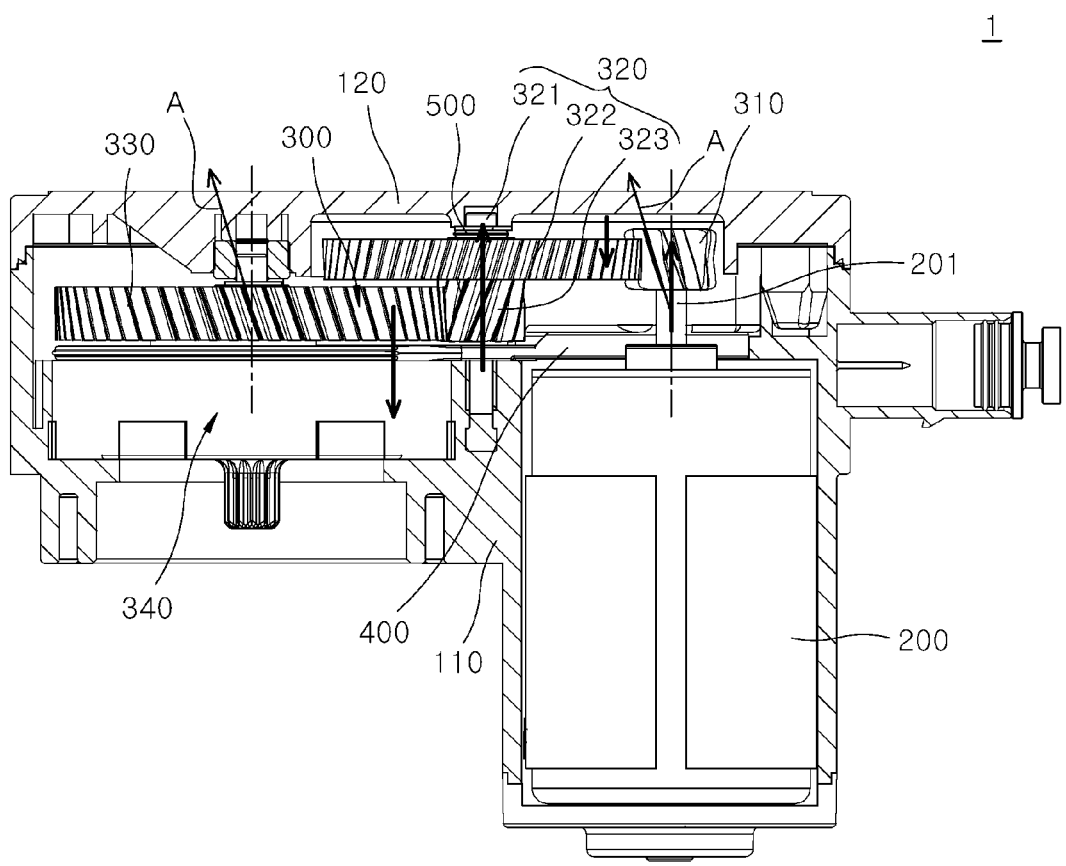
FIG. 14 is an operational view schematically illustrating operations of a power transmission part offsetting axial forces according to the embodiment of the present disclosure.

FIG. 14 is an operational view schematically illustrating operations of a power transmission part offsetting axial forces according to the embodiment of the present disclosure.

First, the power generated by the drive part 200 is transmitted to the first rotary shaft 201 and rotates the first power transmission part 310.

As the first power transmission part 310 rotates, the large-diameter gear 322 of the second power transmission part 320 engaging with the first power transmission part 310 rotates in the direction opposite to the rotation direction of the first power transmission part 310.

Since the tooth of the first power transmission part 310 is inclined at a torsional angle in the second direction A and the tooth of the large-diameter gear 322 is inclined at a torsional angle in the direction opposite to the second direction A, the axial force is applied downward (based on FIG. 14) to the second power transmission part 320.

The small-diameter gear 323 integrally connected to the large-diameter gear 322 rotates together with the large-diameter gear 322.

As the small-diameter gear 323 rotates, the third power transmission member 331 of the third power transmission part 330 engaging with the small-diameter gear 323 rotates in the same direction as the first power transmission part 310.

Since the tooth of the third power transmission member 331 is inclined at a torsional angle in the second direction A and the tooth of the small-diameter gear 323 is inclined at a torsional angle in the direction opposite to the second direction A, the axial force is applied upward (based on FIG. 14) to the second power transmission part 320.

The axial force applied to the second power transmission part 320 by the first power transmission part 310 and the axial force applied to the second power transmission part 320 by the third power transmission part 330 are applied in the directions in which the two axial forces are offset. Therefore, the upward and downward movements of the second power transmission part 320 are inhibited.

Figure 15:
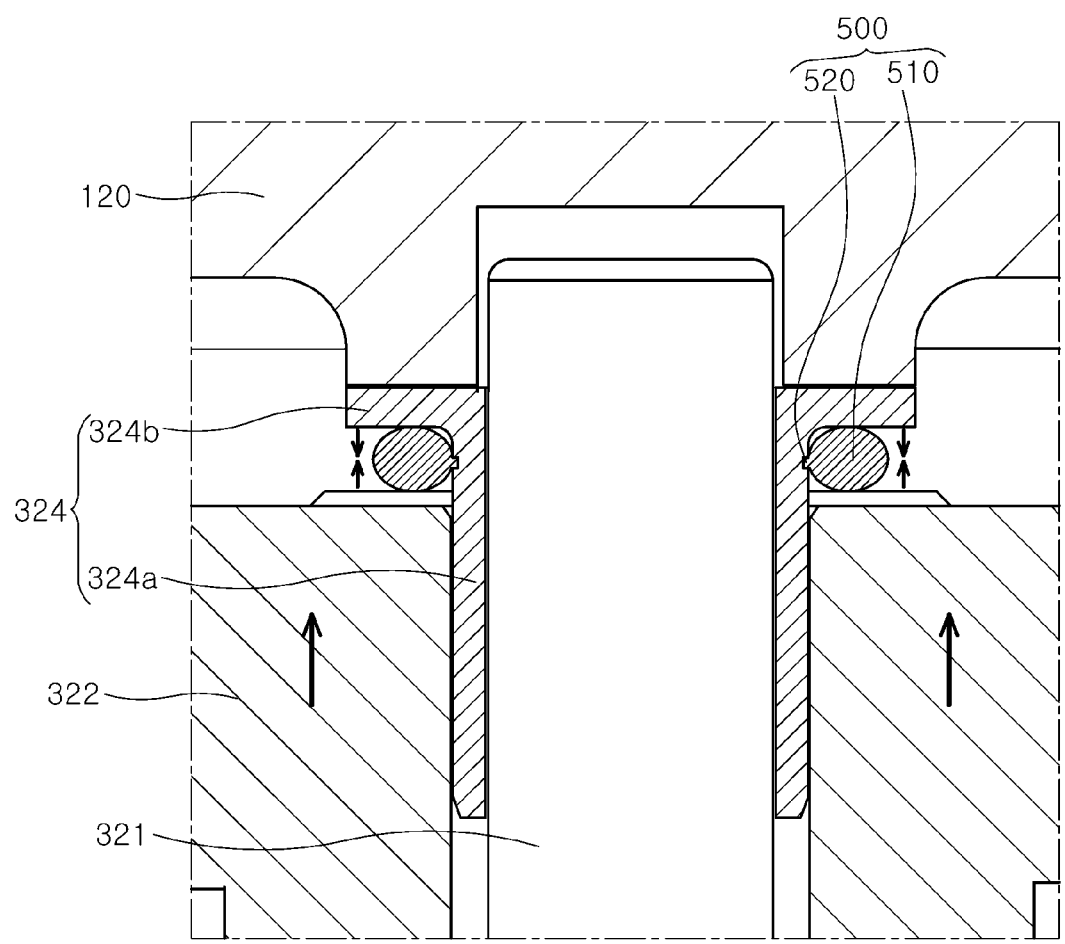
FIG. 15 is an operational view schematically illustrating an operation of the anti-collision part preventing a collision according to the embodiment of the present disclosure.

FIG. 15 is an operational view schematically illustrating an operation of the anti-collision part preventing a collision according to the embodiment of the present disclosure.

When the instantaneous axial force is applied upward (based on FIG. 15) to the second power transmission part 320, the large-diameter gear 322 is moved upward by the axial force.

As the large-diameter gear 322 is moved upward by a predetermined distance or more, an upper surface of the large-diameter gear 322 comes into contact with the anti-collision member 510 and compresses the anti-collision member 510 in the upward/downward direction.

The anti-collision member 510 is elastically deformed by the large-diameter gear 322, thereby applying the elastic restoring force in the direction in which the axial forces applied to the second power transmission part 320 are offset.

As the anti-collision member 510 is continuously and elastically deformed by the movement of the large-diameter gear 322, a magnitude of the elastic restoring force applied to the large-diameter gear 322 gradually increases.

When a magnitude of the elastic restoring force applied to the large-diameter gear 322 by the anti-collision member 510 is equal to a magnitude of the instantaneous axial force applied to the second power transmission part 320, the large-diameter gear 322 cannot move any further and is prevented from colliding with the inner surface of the cover part 120.

Thereafter, the anti-collision member 510 is restored to an original shape by the elastic restoring force and returns the large-diameter gear 322 to the original position.

While the present disclosure has been described with reference to the exemplary embodiment depicted in the drawings, the exemplary embodiment is described just for illustration, and those skilled in the art to the present technology pertains will understand that various modifications of the exemplary embodiment and any other exemplary embodiment equivalent thereto are available.

Thus, the true technical scope of the present disclosure should be defined by the following claims.

What is claimed is:

1. A brake apparatus for a vehicle comprising:
   a housing;
   a drive part configured to generate power;
   a power transmission part disposed in the housing and configured to transmit the power from the drive part while rotating in conjunction with an operation of the drive part; and
   an anti-collision part disposed between the housing and the power transmission part and configured to prevent a collision between the housing and the power transmission part,
   wherein the power transmission part comprises:
      a first power transmission part configured to rotate by receiving the power from the drive part;
      a second power transmission part configured to engage with the first power transmission part and rotate in conjunction with a rotation of the first power transmission part; and
      a third power transmission part configured to engage with the second power transmission part and rotate in the same direction as the first power transmission part in conjunction with a rotation of the second power transmission part,
   wherein the second power transmission part comprises:
      a second rotary shaft, which is the rotary shaft of the anti-collision part penetrates through the through hole of the anti-collision part and is fixed to the housing;
      a first gear configured to rotate about the second rotary shaft and engage with the first power transmission part;
      a second gear configured to extend from the first gear, have a smaller diameter than the first gear, and engage with the third power transmission part; and
      a first friction reducer disposed between the first gear and the second rotary shaft and configured to support the first gear so that the first gear is rotatable,
   wherein the first friction reducer comprises:
      an insertion portion in sliding contact with an inner peripheral surface of the first gear and configured such that the second rotary shaft is inserted into the insertion portion;
      a support portion extending in a radial direction of the insertion portion and configured to adjoin the housing and support the insertion portion; and
      a cut-out portion configured to penetrate the insertion portion and induce deformation of the insertion portion when the second rotary shaft is inserted into the insertion portion.

2. The brake apparatus of claim 1, wherein the first power transmission part and the third power transmission part apply axial forces to the second power transmission part in a direction in which the axial forces are offset.

3. The brake apparatus of claim 2, wherein a tooth of the first power transmission part and a tooth of the third power transmission part are inclined at torsional angles in a second direction, and a tooth of the second power transmission part is inclined at a torsional angle in a direction opposite to the second direction.

4. The brake apparatus of claim 1, wherein the anti-collision part comprises:
   an anti-collision member configured to surround the insertion portion; and
   a movement prevention portion protruding from the anti-collision member, inserted into the insertion portion, and configured to prevent the anti-collision member from moving relative to the insertion portion.

5. The brake apparatus of claim 4, wherein the anti-collision member provides an elastic restoring force, and as the second power transmission part moves toward the housing, the anti-collision member is elastically deformed to prevent contact between the second power transmission part and the housing.

6. The brake apparatus of claim 1, wherein the drive part is configured to receive external electric power.

7. A brake apparatus for a vehicle comprising:
   a caliper module having a cylinder part that faces a pad plate module;
   a piston module installed on the cylinder part so as to be movable forward or rearward and configured to deform the cylinder part by using a reaction force generated when the pad plate module is pressed;
   a transmission module installed on the cylinder part and configured to move the piston module forward or rearward; and
   an actuator connected to the transmission module,
   wherein an installation angle of the transmission module with respect to the piston module is changed when the cylinder part is deformed, such that a movement of the transmission module relative to the cylinder part is prevented,
   wherein the actuator comprises,
      a housing;
      a drive part configured to generate power;
      a power transmission part disposed in the housing and configured to transmit the power to the piston module while rotating in conjunction with an operation of the drive part; and
      an anti-collision part disposed between the housing and the power transmission part and configured to prevent a collision between the housing and the power transmission part,
   wherein the power transmission part comprises:
      a first power transmission part configured to rotate by receiving the power from the drive part;
      a second power transmission part configured to engage with the first power transmission part and rotate in conjunction with a rotation of the first power transmission part; and
      a third power transmission part configured to engage with the second power transmission part and rotate in the same direction as the first power transmission part in conjunction with a rotation of the second power transmission part,
   wherein the second power transmission part comprises:

a second rotary shaft, which is the rotary shaft of the anti-collision part penetrates through the through hole of the anti-collision part and is fixed to the housing;

a first gear configured to rotate about the second rotary shaft and engage with the first power transmission part;

a second gear configured to extend from the first gear, have a smaller diameter than the first gear, and engage with the third power transmission part; and a first friction reducer disposed between the first gear and the second rotary shaft and configured to support the first gear so that the first gear is rotatable, wherein the first friction reducer comprises:
  an insertion portion in sliding contact with an inner peripheral surface of the first gear and configured such that the second rotary shaft is inserted into the insertion portion;
  a support portion extending in a radial direction of the insertion portion and configured to adjoin the housing and support the insertion portion; and
  a cut-out portion configured to penetrate the insertion portion and induce deformation of the insertion portion when the second rotary shaft is inserted into the insertion portion.

8. The brake apparatus of claim 7, wherein the cylinder part is rotated in a first direction by the reaction force generated by the piston module, and the transmission module rotates in the first direction together with the cylinder part.

9. The brake apparatus of claim 8, wherein the transmission module comprises:

a spindle part penetrating the cylinder part and configured to be rotated by a rotational force transmitted from the actuator; and a nut part configured to be in rollable contact with the piston module and press or release the piston module in conjunction with a rotation of the spindle part.

10. The brake apparatus of claim 9, wherein the nut part comprises:

a head portion having a front surface in rollable contact with a rear surface of the piston module in the first direction;

a connection portion extending from a rear surface of the head portion and having an inner peripheral surface thread-coupled to an outer peripheral surface of the spindle part; and an anti-rotation portion disposed at a lateral side of the head portion and configured to prevent an axial rotation of the head portion by interfering with an inner surface of the piston module.

11. The brake apparatus of claim 10, wherein a curvature of the front surface of the head portion corresponds to a curvature of the rear surface of the piston module.

12. The brake apparatus of claim 11, wherein upper and lower surfaces of the head portion are spaced apart from the inner surface of the piston module at predetermined intervals.

13. The brake apparatus of claim 10, further comprising:
a sealing member provided between the cylinder part and the spindle part and configured to prevent a leak of oil,
wherein a center of curvature of the head portion is positioned rearward from the sealing member.

* * * * *